Dec. 10, 1968  R. E. HANSEN  3,415,685
GAS-DEPOLARIZABLE GALVANIC CELL
Filed May 19, 1964  2 Sheets-Sheet 1

INVENTOR.
ROBERT E. HANSEN
BY
ATTORNEY

United States Patent Office 3,415,685
Patented Dec. 10, 1968

3,415,685
GAS-DEPOLARIZABLE GALVANIC CELL
Robert E. Hansen, Cleveland, Ohio, assignor to Union Carbide Corporation, a corporation of New York
Filed May 19, 1964, Ser. No. 368,665
7 Claims. (Cl. 136—83)

ABSTRACT OF THE DISCLOSURE

A gas-depolarizable galvanic cell comprising a casing having a top end provided with a hollow stem portion within which is situated a gas-depolarizable carbon cathode in traverse position thereto, an anode located in the lower portion of the cell and a separator containing liquid electrolyte interposed between the anode and cathode and contacting the lower end of the hollow stem portions so as to define an expansion space surrounding the hollow stem portions and having venting means open to the atmosphere. In the preferred version of the cell, the carbon cathode comprises at least two zones, a first zone extending inwardly from one surface and being electrochemically active and permeable to liquid electrolyte, and a second zone adjacent to the first zone and being repellent to liquid electrolyte and gas-permeable, the first zone being in intimate contact with the separator of the cell.

---

This application is a continuation-in-part of my application U.S. Ser. No. 316,400, now U.S. Patent 3,296,113, "Gas Stream Monitor," filed on Oct 15, 1963, which in turn is a continuation-in-part of my application U.S. Ser. No. 204,818, now abandoned, filed on June 25, 1962.

This invention relates to gas-depolarizable galvanic cells.

Gas-depolarizable cells are employed in analytical and monitoring apparatus for the purpose of measuring the concentration of a depolarizing gas in a gas stream. Typical of such gases are oxygen, chlorine, the nitrogen oxides, and the like. In addition, gas-depolarizable galvanic cells can be used as a source of electric power for signal lanterns, and the like.

In many instances, particularly in conjunction with analytical and monitoring apparatus, gas-depolarizable cells are employed at total pressures other than atmospheric. Previous experience in this area indicates that the sensitivity of gas-depolarizable cells to changes in the concentration of the depolarizing gas has a tendency to vary with varying ambient pressures. Thus in applications where ultimate accuracy is desirable, this tendency represents a shortcoming.

It is the principal object of this invention to provide a gas-depolarizable cell, the sensitivity of which is not affected by variations in total ambient pressure.

It is another object to provide a very compact yet very sensitive gas-depolarizable galvanic cell.

Still other related objects will become readily apparent to the skilled artisan upon reference to the ensuing specification and the claims.

The gas-depolarizable galvanic cell of this invention comprises a casing provided with a bottom and an opposite end which extends inwardly from the casing periphery and terminates in a central, axially arranged hollow stem portion. This stem portion projects downward into the casing. Within the casing is situated an anode which occupies the lower portion thereof. A gas-depolarizable carbon cathode is situated in traverse position within the hollow stem portion and is separated from the anode by a bibulous separator which is in intimate contact with the opposing lateral faces of the cathode and the anode. In addition, the separator, in conjunction with the casing and the hollow stem portion, defines a substantially toroidal expansion space within the casing. The expansion space is vented to the surroundings so as to equalize pressure between the cell interior and the ambient atmosphere. An electrolyte, which can be either alkaline or acidic, is provided between the anode and the cathode and is contained, at least in part, within the separator. An electrical conductor is in contact with the anode and may pass through the bottom of the casing so as to provide an anode terminal. Similarly, another electrical conductor is in contact with the carbon cathode and provides a cathode terminal.

One of the principal features of this invention is the provision of venting means in a gas-depolarizable cell. It has been found that optimum stability of cell performance at varying total gas pressures can be achieved by venting the anode of the cell to the surroundings so as to equalize the pressure both within and without the cell and by providing an expansion space for the anode.

The invention will now be described in greater detail with particular reference to the accompanying drawings in which.

Figure 1:
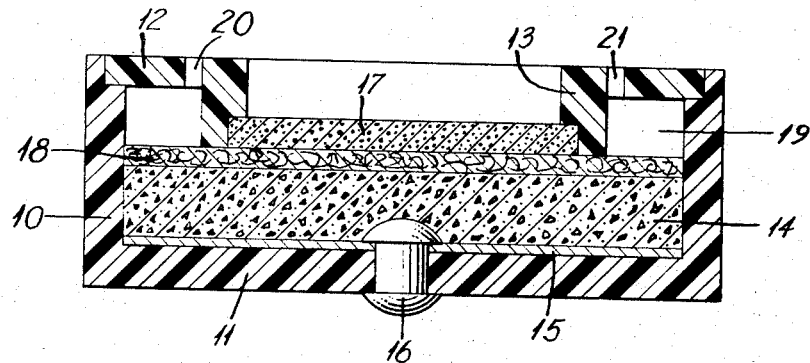
FIG. 1 is a cross-sectional elevation of a gas-depolarizable cell employing a gel-type anode.

Referring now specifically to FIG. 1, a gas-depolarizable cell embodying the invention comprises a casing 10 provided with a bottom 11 which can be integral with the casing walls. An opposite end 12 extends inwardly from the periphery of the casing 10 and terminates in an axially arranged central stem portion 13 which projects downward into the casing 10 and which defines a passage for the depolarizing gas. A gel-type anode 14, containing granules of an anodic material and an electrolyte, is situated in the lower portion of the casing 10. An anode collector 15, in the form of a flat metal plate, underlies the anode 14 and is fastened to the bottom 11 of the casing by means of a rivet 16 which also serves as the anode terminal for the cell. A carbon cathode 17 is situated within the hollow stem portion 13 in traverse position and closes the lower end thereof. The anode 14 and the cathode 17 are separated by means of a bibulous separator 18. The separator 18 contains at least a portion of the electrolyte and is in intimate contact with the opposing faces of both the cathode 17 and the anode 14. The separator 18 is also in contact with at least the lower end of the hollow stem portion 13. Thus, the separator 18, in conjunction with the casing 10 and the hollow stem portion 13, defines an expansion space 19 for the anode 14 which resides within the upper portions of the cell surrounding the hollow stem portion 13 just below the end 12. The expansion space 19 is vented to the surroundings by means of the vent holes 20 and 21 provided within the end 12. During storage of the cell, the vent holes 20 and 21 can be plugged in any convenient manner so as to avoid the loss of the electrolyte by evaporation. A cathode terminal for the cell is not shown in the interests of simplicity but can be provided in any convenient manner, for example, by affixing an electrical conductor to the cathode 17 taking care, however, not to obstruct the access of depolarizing gases thereto.

Figure 2:
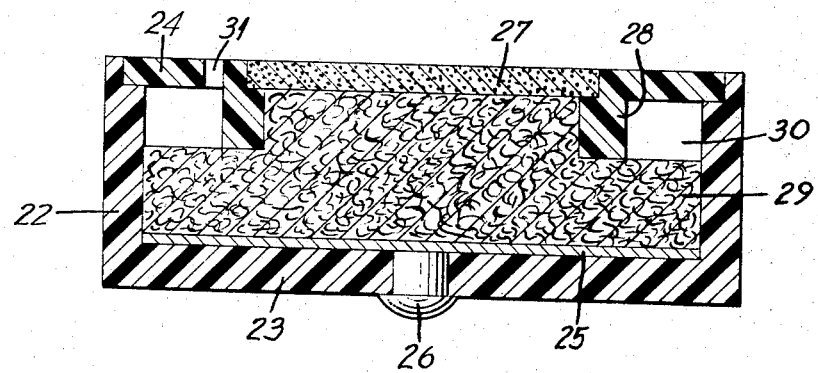
FIG. 2 is a cross-sectional elevation of a gas-depolarizable cell employing a flat plate anode.

FIG. 2 shows another embodiment of this invention which employs a flat plate anode and thus obviates the use of an anode collector. A casing 22 is provided with a bottom 23 and an inwardly extending opposite end 24. A flat plate anode 25 extends over the bottom 23 of the casing and is affixed thereto by the rivet 26 which extends through the bottom 23 and also serves as the anode terminal. The inwardly extending opposite end 24 again terminates in a hollow stem portion 28 which projects downward into the casing 22. A cathode 27 is mounted within the stem portion 28 in traverse position so that the upper face of the cathode 27 is flush with the outer face of the end 24. A bibulous separator 29 is interposed between the anode 25 and the cathode 27 so that it is in intimate contact with the opposing faces of both the anode 25 and the cathode 27. An expansion space 30 is defined by the separator 29, the casing 22, and the stem portion 28, and is vented to the surroundings by a vent hole 31 in the end 24. More than one vent hole may be used, if desired.

The carbon cathode is a very important component of the gas-depolarizable cell. The activation, porosity, etc. of the cathode govern its voltage sensitivity, and the thickness of the cathode is a factor in determining the response time. The cathode is usually molded as a flat plate, followed by various heat and atmospheric treatments which produce the desired structure and electrochemical activity.

The cathodes used in the cells of this invention can be prepared from a mixture consisting of about 60 percent by weight of projector-type carbon, about 40 percent by weight of soft pitch and about 1½ percent by weight of fuel oil. If desired, suitable plastic binders may be substituted for the pitch and fuel oil and the amount of binder adjusted accordingly. Cathodes having the desired dimensions are extruded or molded from such a mix and baked at 1000° C. for about 6 hours. After this baking, the cathodes have a porosity of from about 20 to about 33 percent, using water saturation method measurement. The cathodes are next heated in a $CO_2$ atmosphere between 850° C. to 950° C. for two hours to convert their hard and shiny skin to a surface having a dark black appearance. In this condition the carbon cathodes are better able to absorb the catalyzing solution in which they will be immersed. Such a solution consists of an 0.1 molar solution of aluminum nitrate and cobalt nitrate containing 75 grams $Al(NO_3)_3 \cdot 9H_2O$ and 29 grams

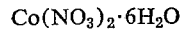

$$Co(NO_3)_2 \cdot 6H_2O$$

per liter. Generally, one carbon cathode of approximately 10 square centimeter surface area requires about 1.5 ml. of solution. Good results have been obtained by placing the carbon dioxide-treated carbon cathodes, once cooled, in a container which is then evacuated. After obtaining a vacuum of about 20 millimeters of mercury, the catalyzing solution is allowed to enter the container, and to soak the electrodes. Upon restoring the air pressure, the solution is pressed into the pores of the cathodes. The cathodes are then dried at about 100° C. for two hours, and heated again to about 850° C. for two hours in carbon dioxide to decompose the metal nitrates to oxides. After this treatment a spinel of the formula $CoO \cdot Al_2O_3$ is formed from the catalyst mixture. The deposit is observable on the surface of the carbon cathodes as a blue deposit. After cooling the carbon cathodes in a carbon dioxide atmosphere, the vacuum operating and heating cycles are repeated to increase the activity of the carbon surface. In some instances, the spinel catalyst may be omitted, provided the electrode surface area is properly developed.

Optionally, the cathodes can be further treated with a noble metal catalyst such as platinum. This can be accomplished by painting on the carbon cathode surface an aqueous solution containing about 10 percent of chloroplatinic acid ($H_2PtCl_6 \cdot 6H_2O$). This compound, when deposited on the cathode surface, is thermally decomposed by conventional methods so as to yield a catalytically active noble metal. The noble metal catalyst is deposited on the cathodes when it is desired to increase the voltage and load capability of the cell. The amount employed is dependent on the desired output characteristics of the cell.

It is also desirable to wetproof the carbon cathodes. This can be achieved by immersing the electrodes in a paraffin-petroleum ether solution (the paraffin concentration can be as high as about 2 weight percent, or as low as about 0.5 weight percent) for about five minutes. Following this, the electrodes are air-dried. Wet-proofing aids in reducing polarization of the cathode, but too much wet-proofing is detrimental to cathode life, in that it adversely affects the load capability of the cell by decreasing the available electrode surface area.

Other wet-proofing agents can be used in addition to paraffin and petroleum ether. Thus chloronaphthalene and dibenzylether may be used.

For the gas-depolarizable cell of this invention, a preferred cathode comprises a porous carbon body having at least two zones: a first zone, extending inwardly from the electrolyte side of the electrode, which is highly permeable to the liquid electrolyte and extremely active electrochemically; and a second zone, adjacent the first zone, which is gas-permeable and highly repellent to the liquid electrolyte. Preferably, each zone is made up of a plurality of layers so as to provide gradients of electrolyte repellency and electrochemical activity between the two surfaces. However, a simple two-layer electrode may be used, if desired. Proceeding from the electrolyte side to the gas side of the electrode, the electrolyte repellency increases, while the electrochemical activity decreases.

By providing a cathode having an active electrolyte-permeable zone and an adjacent gas-permeable, electrolyte-repellent zone, an effective gas-electrolyte-electrode interface without electrode drowning is obtained. Not only can a liquid electrolyte penetrate into the electrode to reach the interior surface of the cathode, but there is also little or no wetproofing in this active layer of the electrode to cover the active centers of the cathode material. Moreover, since the active zone is adjoined by an electrolyte barrier zone which is repellent to liquid electrolyte, drowning of the cathode is effectively prevented without precise control of gas pressure.

In a further preferred embodiment, there is provided also a differential in pore size through the cathode, with the larger pores being on the depolarizing gas side of the cathode. This facilitates gas entry and water vapor removal on the depolarizing gas side of the cathode, while inhibiting gas bubbling through the electrolyte side of the cathode.

The first zone of the cathode can be made of a multiplicity of finely-divided active particles having a high surface area, such as activated carbon. This zone is designed to be very active electrochemically and usually contains a catalyst such as the platinum metals to promote the electrochemical reaction. The active particles in the first zone are bonded together by a suitable binder, such as a thermoplastic resin or carbonized pitch. This zone may also contain a small amount of wetproofing agent, depending on the particular method employed to wetproof the remainder of the electrode. In any event, however, it is important that the first zone be permeable to liquid electrolyte and electrochemically active. For example, when the only liquid-repellent material is a thermoplastic binder, the concentration of binder should not be greater than about 33 volume percent at any point in this zone. When the only liquid-repellent is paraffin or a similar wet-proofing agent, the paraffin concentration should never be greater than about 5 weight percent. The conductive particles in the first zone should be very finely divided, such as carbon flour, to make the zone microporous and thereby inhibit the bubbling of gas therethrough. Thus, the average pore size in the first zone is preferably in the range of about 0.1 to 1 micron.

The second zone of the cathode differs from the first zone in that it is repellent to liquid electrolyte, is not activated nor catalyzed, and is made of larger conductive particles to provide larger pore sizes. In other words, the second zone is designed to be highly electrolyte-repellent and gas-permeable, but not electrochemically active. The repellency of the second zone may be achieved by a number of different mechanisms. For example, this zone may be made of inherently liquid-repellent materials, such as powdered graphite or wetproofed inactive metal powders, and/or the particles may be bonded together with relatively large amounts of a repellent thermoplastic binder, such as polyethylene. Similarly, the second zone may be made repellent by impregnating it with paraffin or other wetproofing agent. The second zone should have larger pore sizes than the first zone so as to facilitate gas entry and water vapor removal. Thus, the pore sizes in the second zone of the cathode are preferably in the range of about 1 to 20 microns.

Both cathode zones should have a high electrical conductivity in order to keep the cathode electrical resistance at a minimum. Thus, the conductive particles in both zones should be in electrical circuit with each other, such as by having the particles in contact with each other and/or by the use of a conductive binder.

The preferred thicknesses of the two cathode zones depend on a number of factors, such as the type of material employed, the pore sizes, and the size and strength requirements for the cathode. The lower limit for the thickness of the first zone is that which permits the electrolyte to penetrate into the cathode sufficiently to reach the interior surfaces of the cathode, while the upper limit is that which prevents the electrolyte from penetrating into the cathode sufficiently to cause drowning. In general, the thickness of the first zone should be between about 0.010 and about 0.065 inch. The only requirement on the thickness of the second zone is that it be sufficient to prevent penetration of the electrolyte through the cathode. Of course, it is usually desirable to make the second zone as thin as possible consistent with good repellency. It will be understood that the second zone need not extend all the way to the gas surface of the cathode, as long as the zone is sufficiently thick to prevent penetration of a liquid electrolyte.

The preferred cathodes and the methods for their manufacture are fully disclosed and claimed in copending application, Ser. No. 370,394, filed of even date and having a common assignee. The disclosure of the foregoing application is incorporated herein by reference. Thus the manufacturing methods will be described only briefly hereinbelow.

One method of making the preferred cathodes is by thermoplastic bonding. This method is very advantageous for a number of reasons. For example, the desired properties in the different zones of the cathodes can be controlled solely by adjusting the composition of the starting materials, without the need for any subsequent wetproofing or cleaning treatments. Moreover, this method permits accurate control of both the size and properties of the different zones even in extremely thin cathodes. Thin plastic bonded cathodes are also highly flexible, thus minimizing the chances of breakage.

There are many possible variations of the thermoplastic bonding method. For example, the cathode may be provided with any number of layers, as long as the layers on one side of the cathode form a zone which is electrochemically active and electrolyte-permeable and the layers adjacent the active zone form a zone which is highly electrolyte-repellent and gas-permeable. Since the active layer is made of carbon, preferably it should be catalyzed with a noble metal or other suitable catalyst as hereinabove set forth.

A large number of thermoplastic materials are suitable for use as binding agents in the cathode. Examples of suitable materials are polyethylene, polypropylene, polychlorofluoroethylene, polytetrafluoroethylene, and various vinyl resins. Since the inherent liquid repellency of the thermoplastic materials varies somewhat, the exact amount of binder required may vary depending on the particular binder employed. In oder to achieve a unifom mixture of the starting composition, it has been found to be desirable to dissolve polyethylene in hot toluene and then cool it to recrystallize the resin, as described in British Patent 571,814. This produces an extremely fine crystalline powder which can be uniformly mixed with the conductive particles. Also, both the conductive particles and the resin may be mixed in the hot toluene, so that the polyethylene precipitates directly on the surface of the conductive particles. After the cathode has been formed, it may be irradiated in order to harden the thermoplastic binder.

Another method of making the preferred cathode is by pre-forming the porous cathode with the desired electrochemical characteristics, impregnating the cathode with a wetproofing agent, and then preferentially removing the wetproofing agent from the active zone of the cathode. In this method, the pre-formed cathode may be made with or without a thermoplastic binder because the desired gradient of electrolyte repellency is achieved by controlling the location of the wetproofing agent in the cathode.

The cathode may be initially formed by a thermoplastic bonding method similar to that described above or by any of the conventional molding or extruding methods. Of course, the electrolyte side of the cathode must be made of an active material such as activated carbon, and is usually provided with a suitable cathodic catalyst. Also as described above, the cathode is preferably provided with a smaller pore size on the electrolyte side than on the gas side.

The pre-formed cathode may be impregnated with the wetproofing agent by immersion in a bath, by vapor deposition, or any other suitable technique. In one embodiment of this method, the electrode is immersed in a bath of molten paraffin at a temperature well above the melting point of the paraffin, e.g., 150° C. The cathode is allowed to remain in the bath until it is thoroughly soaked with paraffin, i.e., until the electrode stops bubbling desorbed air. The cathode is then removed from the bath and slowly cooled.

After the cathode has been thoroughly impregnated with the desired wetproofing agent, it is further treated to remove a sufficient amount of the wetproofing agent from the active zone on the electrolyte side of the cathode to render that zone electrolyte-permeable and highly active. Of course, the remainder of the cathode must remain electrolyte-repellent. This removal of wetpoofing agent significantly improves the electrochemical activity of the cathode. The wetproofing agent may be removed from the active zone of the cathode by several different methods. One such method is to heat the cathode in an oven at 200 to 250° C. while pressing the active surface of the cathode against a sheet of absorbent paper to absorb molten paraffin from the cathode. Whereas the original paraffin content of the soaked cathode may be as high as 20 to 30 weight percent, a 30-minute heat treatment in contact with the absorbent material reduces the paraffin content to about 10 weight percent. The cathode is then cooled and immersed in petroleum ether or other suitable solvent to leach additional wetproofing agent from the active zone of the cathode and thereby insure that the active centers of the cathode are not covered with wetproofing agent. Alternatively, the active zone of the cathode may be leached by passing it over a bath of heated refluxing solvent, such as petroleum ether, so that the solvent vapors act as the leaching agent. This method has the advantage that the solvent vapors are always free of the wetproofing agent.

Another method of removing the wetproofing agent from the active zone of the cathode is by vacuum distillation. For example, paraffin may be vacuum distilled from carbon electrodes by heating the electrode at a temperature of 180° C. under a pressure of about $10^{-2}$ millimeters of mercury.

Each of the methods described above for removing wetproofing agent from the active zone of the cathode removes more wetproofing agent from the outer portion of the zone than from the inner portion. Thus, there is a gradation of properties in the final cathode. Proceeding from the electrolyte side to the gas side of the cathode, the electrolyte-repellency gradually increases, while the electrochemical activity gradually decreases. Of course, these properties can be controlled by varying the steps of adding and removing the wetproofing agent. After the wetproofing agent has been removed, the active zone of the cathode preferably is catalyzed, such as by impregnating it with a solution of a noble metal salt and then heating to the decomposition temperature of the salt to deposit the noble metal.

There are many possible variations in the wetproofing method described above. For example, the original soaking of the cathode may be carried out in concentrated solutions of paraffin in a solvent, e.g., 10 to 20 weight percent paraffin in kerosene, rather than in molten paraffin. Alternatively, the cathode may be impregnated with the wetproofing agent during the molding or forming operation. Also, another wetproofing agent, such as polyethylene, chloronaphthalene, or dibenzylether, may be used in place of paraffin, as long as it can be leached or vacuum distilled from the active zone of the electrode.

In another method for preparing the cathodes by impregnating a pre-formed cathode with a wetproofing agent, the active zone of the cathode is initially treated to prevent the wetproofing agent from adhering to that zone. For example, a layer of sodium-carboxymethylcellulose or other suitable electrolyte-soluble material may be deposited on the active surface of the cathode prior to the impregnating step. This material penetrates into the pores of the active zone, and the cathode is then impregnated with the wetproofing agent as described above. In this case, no removal of the wetproofing agent from the active zone is necessary. When the cathode is put into service the electrolyte-soluble material is dissolved in the electrolyte. The resulting cathode has a highly active layer on the electrolyte side, with the remainder of the cathode being highly electrolyte repellent.

In any of the aforedescribed methods involving impregnation of a pre-formed cathode with a wetproofing agent, it is preferred to clean the cathode by heat and vacuum to remove volatile impurities therefrom prior to the impregnating step. This has been found to facilitate the wax impregnation and enhances the electrochemical activity of the active cathode zone. Moreover, the vacuum cleaning has been found to permit the use of a broader range of wetproofing solutions. For example, vacuum-cleaned carbon cathodes have been wetproofed by soaking in a solution of about 5 percent paraffin dissolved in high-boiling kerosene (200–240° C.). The vacuum cleaning removed traces of volatile solvents from the carbon and made the paraffin-kerosene solution adhere firmly to the surface of the carbon particles. Subsequent vacuum distillation removed most of the kerosene. Other electrodes were treated in the same manner but using paraffin oil as the wetproofing solution.

When the cathodes prepared in this manner are to be used in an oxygen-depolarizable cell, it is preferred to use non-oxidizable wetproofing agents, such as chlorinated paraffin or polychlorofluoroethylene oil. To achieve good performance from electrodes wetproofed with the polychlorofluoroethylene oil, the soaked cathode should be subjected to a vacuum distillation treatment at a temperature of 180° C. and a pressure of about $5 \times 10^{-2}$ millimeters of mercury.

The anode of the gas-depolarizable cell can be zinc, cadmium, or the like, either particulate in form or a flat plate. A particulate anode normally is made from a mixture of amalgamated zinc powder or cadmium powder, sodium carboxymethylcellulose (CMC) and water. The mixture is dried and reduced to small granules. The CMC is used to prevent oxidation of the zinc powder. Moreover, when the granules are wet with the electrolyte, the CMC forms a gel which immobilizes the electrolyte, thus enabling operation of the cell in any position.

The service capacity of the cell, in terms of hours of operation, is determined by the amount of zinc present in the anode. For example, for an operation period of about eight hours at a current of about 10 milliamperes for a typical cell, about 0.1 gram of zinc is required; however, at least a ten fold excess of zinc is normally used in order to insure constant performance characteristics. If it is desired to increase the operating life of the cell, the cell may be subjected to a lower current drain while containing the same amount of zinc.

The cell can be activated just prior to use by pouring the electrolyte through the vent holes into the cell and onto the separator so as to contact the anode. Activation can also be accomplished by injecting the electrolyte, e.g., by means of a syringe, through a special electrolyte filling port located in another part of the cell. This port can be sealed with a resilient material (e.g., a silicone rubber) which can be easily penetrated by the syringe; thus the seal need not be removed.

Activation can also be carried out as soon as the element is assembled; subsequent to the activation, the cell can be stored in an air-tight container or bag until used, or the vent holes may be plugged to avoid vaporization losses. For reasons of convenience, the latter activation method is preferred.

As set forth above, the electrolyte can be either acidic or alkaline, and can be a liquid or a gel. Typical electrolytes are aqueous solutions of potassium hydroxide, sodium hydroxide, ammonium chloride, zinc chloride, and the like. The particular electrolyte concentration is dependent on the conductivity and the activity desired. Normally the concentration of alkaline electrolytes is in the range from about 6 N to about 12 N. For acid electrolytes, the pH of the electrolyte may range from about 2 to about 6.

Alkaline electrolytes can be advantageously employed in instances where carbon dioxide contamination is not a problem; however, acidic electrolytes are often preferred because cells employing an acidic electrolyte are substantially less sensitive to carbon dioxide. Moreover, the latter cells are about twice as sensitive to changes in oxygen concentration as compared to those employing alkaline electrolytes. The response time of an acidic cell is somewhat greater than that of an alkaline cell, yet in both instances the response times are satisfactory for many uses.

A particularly preferred electrolyte is an acidified aqueous zinc chloride solution gelled with corn starch, polyalkylene oxide, or the like. Such an electrolyte can be prepared by constituting two solutions as follows:

Solution A—                          Amount, parts by weight
    Distilled water _____ 250
    Zinc chloride (dry) _____ 125
    Mercuric chloride _____ 2.5
    Hydrochloric acid (conc.), about 1 drop.

Solution B—
    Distilled water _____ 250
    Corn starch _____ 37

Equal volumes of solutions A and B are then combined and the resulting solution heated at about 100 C. until a gel is obtained. The electrolyte thus obtained then is ready for use.

This invention is illustrated by the following examples.

EXAMPLE I

A carbon cathode material was prepared in the following manner. A sintered nickel plaque (0.035 inch thick, 80% porosity) containing an embedded nickel wire screen for additional support, was coated by spraying with a fluorocarbon resin. About 0.1 gram of the resin per square inch of the nickel plaque was applied, and the coated nickel plaque was then dried at about 100° C.

The coated nickel plaque was used as a substrate and sprayed with a slurry containing unactivated carbon (particle size: through 100 mesh) and an emulsion of a fluorocarbon resin (about 60 percent solids) so as to obtain a weight gain of about 0.12 gram of solids per square inch of the substrate after drying.

The resulting material was then heated at about 400° C. in an inert atmosphere for about two hours. The carbon-bearing surface of the material was then hot sprayed (at about 90° to 100° C.) with a toluene solution containing polyethylene (about 1 percent by weight) so as to give a thin coating of about 0.01 gram of polyethylene per square inch of the material. Subsequently three additional layers of a mixture of polyethylene and finely-divided activated carbon (through 200 mesh) in toluene were sprayed on. For the first of the three layers, the weight ratio of polyethylene to activated carbon was 1:5, for the second layer the weight ratio was 1:8, and for the third layer the weight ratio was 1:13, respectively. These three layers represent the electrochemically active portion of the cathode.

The thus coated material was then hot pressed (about 45 p.s.i.g. steam) at 1000 p.s.i. The surface of the resulting cathode material was then catalyzed by applying thereto a solution of rhodium chloride and palladium chloride in isopropanol and thereafter heating the cathode material to a temperature sufficiently high to decompose the chlorides and deposit on the cathode material rhodium and palladium in a finely-divided active form.

EXAMPLE II

A portion of the cathode material prepared in accordance with the procedure set forth in Example I was used in assembling a cell of the type shown in FIG. 2. The cell also employed an amalgamated zinc flat plate anode and a bibulous separator cut from a sheet of regenerated cellulose. The electrolyte was 9 N aqueous solution of potassium hydroxide containing about 2 weight percent of zinc oxide dissolved therein.

The cell was operated at about 70° C. with a 1000 ohm load and under a total gas pressure varying from about one to about three atmospheres. Oxygen was employed as the depolarizing gas and was present in varying concentrations ranging from less than about 200 millimeters of mercury to more than about 2000 millimeter of mercury oxygen partial pressure.

Figure 3:
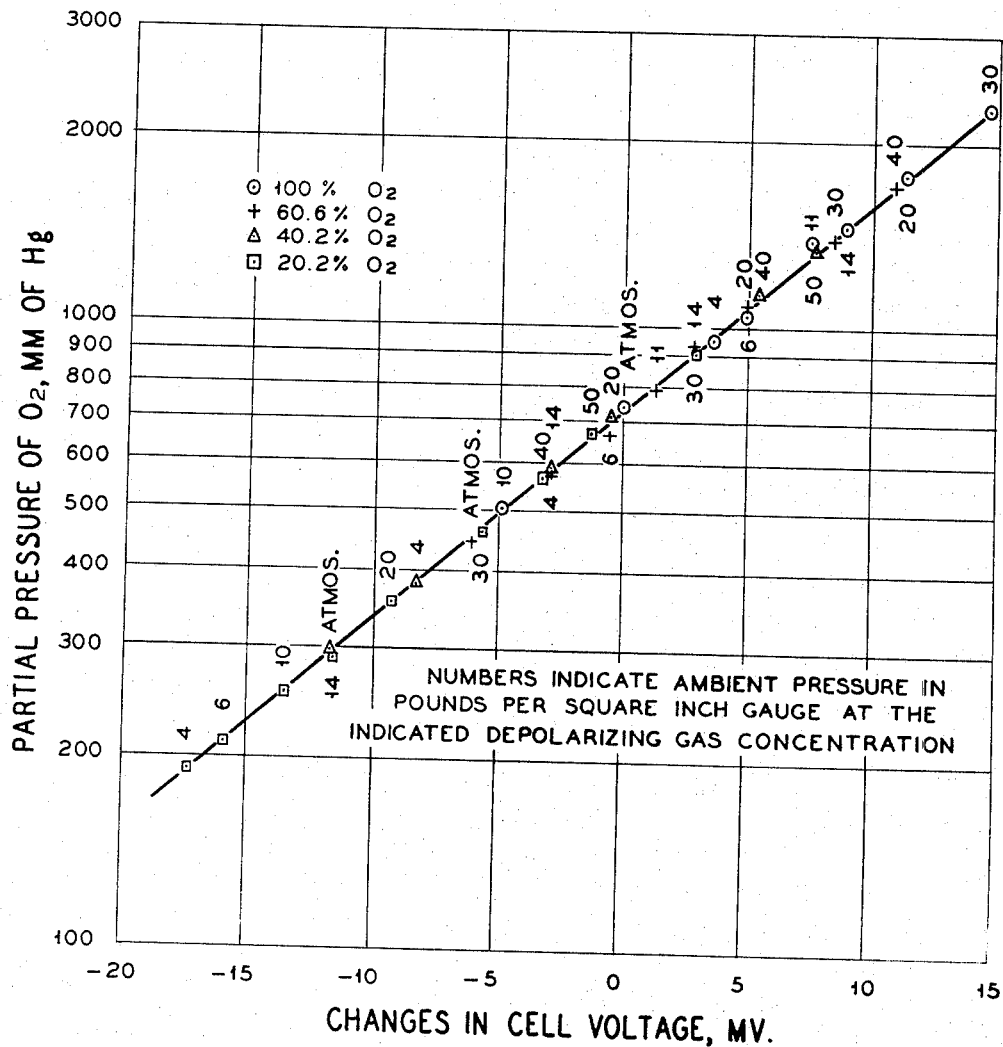
FIG. 3 is a graphical presentation showing the performance of a gas-depolarizable cell of the present invention over a wide range of ambient pressures.

The experimental results are shown in FIG. 3 as a plot of partial pressure of oxygen versus change in cell voltage relative to a zero millivolt output at 740 mm. of Hg oxygen partial pressure at a total pressure varying from about one to about three atmospheres. These results clearly indicate that the operating characteristics of the gas-depolarizable cells of this invention are not affected by the ambient pressure.

The foregoing discussion and the examples are intended to be merely illustrative and are not to be interpreted as limiting. Many changes in the details and materials of construction and the arrangement of parts may be resorted to without departure from the scope and the spirit of this invention.

I claim:

1. A gas-depolarizable galvanic cell which comprises a casing having a bottom and an opposite top end extending inwardly from the casing periphery and terminating in a central, axially arranged hollow stem portion projecting downward into the casing; an anode situated within the casing and occupying the lower portion thereof; a gas-depolarizable carbon cathode situated in traverse position within the hollow stem portion constructed and arranged to be exposed to the ambient gas, a bibulous separator interposed between the anode and the cathode and contacting at least the lower end of the hollow stem portion, said separator being in intimate contact with the opposing lateral faces of the anode and cathode, and, in conjunction with the casing and the hollow stem portion, defining an expansion space surrounding the hollow stem portion within the upper portion of the cell; an electrolyte contained within the separator; and electrical conductor means in contact with the anode and providing an anode terminal; and an electrical conductor means in contact with the cathode and providing a cathode terminal; said opposite top end of the casing being provided with at least one vent opening communicating with the expansion space and the interior of the cell so as to equalize pressure between the cell interior and ambient atmosphere.

2. The cell in accordance with claim 1 wherein the carbon cathode is provided with at least two zones, a first zone which is electrochemically active and liquid electrolyte permeable, extending inwardly from one surface of the cathode, and a second zone, which is gas-permeable and repellent to liquid electrolyte, adjacent to the first zone; said first zone being in intimate contact with the separator.

3. An oxygen-depolarizable galvanic cell which comprises a casing having an integral bottom and an opposite top end extending inwardly from the casing periphery and terminating in a central, axially arranged hollow stem portion projecting downward into the casing; a granulated zinc anode admixed with a gelled electrolyte, situated within the casing and occupying the lower portion thereof; an anode collector underlying the anode; an oxygen-depolarizable carbon cathode situated in traverse position within the hollow stem portion constructed and arranged to be exposed to the ambient gas, said carbon cathode having at least two zones, a first zone extending inwardly from one surface and being electrochemically active and permeable to liquid electrolyte, and second zone adjacent to said first zone and being repellent to liquid electrolyte and gas-permeable, said first zone comprising a plurality of adjacent layers, each of said layers being more electrolyte-repellent and less electrochemically active than the next outer layer adjacent thereto; a bibulous separator wetted by the electrolyte, interposed between the anode and the first zone side of cathode and contacting at least the lower end of the hollow stem portion, said separator being in intimate contact with the opposing lateral faces of the anode and cathode, and, in conjunction with the casing and the hollow stem portion, defining an expansion space surrounding the hollow stem portion within the upper portions of the cell; an electrical conductor means in contact with the anode collector and passing through the bottom of the casing so as to provide an anode terminal; and an electrical conductor means in contact with the cathode and providing a cathode terminal; said opposite top end of the casing being provided with at least one vent opening communicating with the expansion space and the interior of the cell so as to equalize pressure between the cell interior and ambient atmosphere.

4. A gas-depolarizable galvanic cell which comprises a casing having a bottom end and an opposite top end extending inwardly from the casing periphery and terminating in a central, axially arranged hollow stem portion projecting downward into the casing; an anode situated within the casing and occupying the lower portion thereof; a gas-depolarizable carbon cathode situated in traverse position within the hollow stem portion constructed and arranged to be exposed to the ambient gas, said carbon cathode having at least two zones, a first zone extending inwardly from one surface and being electrochemically active and permeable to liquid electrolyte, and a second zone adjacent to said first zone and being repellent to liquid electrolyte and gas-permeable, said first zone comprising a plurality of adjacent layers, each of said layers being more electrolyte-repellent and less electrochemically active than the next outer layer adjacent thereto; a bibulous separator interposed between the anode and the first zone side of the cathode and contacting at least the lower end of the hollow stem portion, said separator being in intimate contact with the opposing lateral faces of the anode and cathode, and an electrolyte contained within the separator; the anode, cathode and separator being so arranged as to define an expansion space open to the interior of the cell and having a venting means so as to equalize pressure between the cell interior and ambient atmosphere.

5. The cell in accordance with claim 4 wherein the first zone of said cathode has a smaller average pore size than the remainder of said cathode.

6. The cell in accordance with claim 5 wherein the first zone of said cathode has an average pore size of between about 0.1 micron and about 1 micron and the remainder of said cathode has an average pore size of between about 1 micron and about 20 microns.

7. An oxygen-depolarizable galvanic cell which comprises a casing having an integral bottom and an opposite top end extending inwardly from the casing periphery and terminating in a central, axially arranged hollow stem portion projecting downward into the casing; a flat plate zinc anode extending over the bottom of the casing; an oxygen-depolarizable carbon cathode situated in traverse position within the hollow stem portion, said carbon cathode having at least two zones, a first zone extending inwardly from one surface and being electrochemically active and permeable to liquid electrolyte, and a second zone adjacent to said first zone and being repellent to liquid electrolyte and gas-permeable, said first zone comprising a plurality of adjacent layers, each of said layers being more electrolyte-repellent and less electrochemically active than the next outer layer adjacent thereto; a bibulous separator containing the cell electrolyte interposed between the opposing lateral faces of the anode and the first zone side of the cathode and contacting at least the lower end of the hollow stem portion, said separator being in intimate contact with the opposing lateral faces of the anode and cathode and, in conjunction with the casing and the hollow stem portion, defining an expansion space surrounding the hollow stem portion within the upper portion of the cell; an electrical conductor means in contact with the anode and passing through the bottom of the casing so as to provide an anode terminal; and an electrical conductor means in contact with the cathode and providing a cathode terminal; said opposite end of the casing being provided with at least one vent opening communicating with the expansion space and the interior of the cell so as to equalize pressure between the cell interior and ambient atmosphere.

References Cited
UNITED STATES PATENTS

| | | | |
|---|---|---|---|
| 1,380,034 | 5/1921 | Balderston | 136—83 |
| 2,275,281 | 3/1942 | Berl | 136—86.2 |
| 2,825,748 | 3/1958 | Coler | 136—83 |
| 2,829,186 | 4/1958 | Kort | 136—86 |
| 2,914,596 | 11/1959 | Gorin et al. | 136—86 |
| 2,938,064 | 5/1960 | Kordesch | 136—86 |
| 3,300,343 | 1/1967 | Huber et al. | 136—86 |

WINSTON A. DOUGLAS, *Primary Examiner.*

H. FEELEY, *Assistant Examiner.*

U.S. Cl. X.R.

136—177